(12) United States Patent
Savry et al.

(10) Patent No.: US 8,022,810 B2
(45) Date of Patent: Sep. 20, 2011

(54) CONTACTLESS PRIVACY PROTECTION DEVICE

(75) Inventors: Olivier Savry, Sassenage (FR);
Francois Vacherand, Le Pont de Claix (FR); Elisabeth Crochon, Poisat (FR)

(73) Assignee: Commissariat a l'Energie Atomique, Paris (FR)

( * ) Notice: Subject to any disclaimer, the term of this patent is extended or adjusted under 35 U.S.C. 154(b) by 1223 days.

(21) Appl. No.: 11/575,333

(22) PCT Filed: Sep. 26, 2005

(86) PCT No.: PCT/FR2005/050778
§ 371 (c)(1),
(2), (4) Date: Mar. 15, 2007

(87) PCT Pub. No.: WO2006/035177
PCT Pub. Date: Apr. 6, 2006

(65) Prior Publication Data
US 2008/0055082 A1    Mar. 6, 2008

(30) Foreign Application Priority Data

Sep. 27, 2004    (FR) ..................... 04 52170

(51) Int. Cl.
*G08B 13/14*    (2006.01)
(52) U.S. Cl. ..................... 340/10.1; 455/41.1
(58) Field of Classification Search ............. 340/10.1, 340/10.3, 572.1, 5.2, 572.3, 5.31; 455/41.1, 455/41.2; 235/380, 439
See application file for complete search history.

(56) References Cited

U.S. PATENT DOCUMENTS

| 5,557,085 | A | 9/1996 | Tyren et al. |
|---|---|---|---|
| 6,636,146 | B1 | 10/2003 | Wehoski |
| 6,650,228 | B1 | 11/2003 | Vacherand et al. |
| 2003/0061063 | A1 | 3/2003 | Vacherand et al. |
| 2003/0137968 | A1* | 7/2003 | Lareau et al. ............ 370/349 |
| 2004/0100359 | A1* | 5/2004 | Reade et al. ............ 340/5.2 |
| 2004/0145472 | A1* | 7/2004 | Schmidtberg et al. ... 340/539.27 |
| 2006/0033608 | A1* | 2/2006 | Juels et al. ............ 340/10.1 |
| 2006/0284726 | A1 | 12/2006 | Crochon et al. |

FOREIGN PATENT DOCUMENTS

| DE | 100 12 057 A1 | 9/2001 |
|---|---|---|
| DE | 102 08 478 A1 | 9/2003 |

(Continued)

OTHER PUBLICATIONS

English translation of the Japanese Office Action issued Sep. 14, 2010, in Patent Application No. 2007-532938.

*Primary Examiner* — Brian Zimmerman
*Assistant Examiner* — Nabil Syed
(74) *Attorney, Agent, or Firm* — Oblon, Spivak, McClelland, Maier & Neustadt, L.L.P.

(57) ABSTRACT

A privacy protection method designed to prevent or authorize a communication between a reader and an RFID label situated in an efficiency zone. In the method a) there is permanent detection of possible variation of an ambient magnetic field in one or more frequency bands allocated to the RFID labels, and b) in the event of detection of an instantaneous variation of the local magnetic field and in the absence of inhibition, a parameter value of a magnetic circuit is modified so that the instantaneous value of the local magnetic field is modified.

11 Claims, 2 Drawing Sheets

FOREIGN PATENT DOCUMENTS

| | | |
|---|---|---|
| GB | 2 365 699 A | 2/2002 |
| JP | 2001-502833 | 2/2001 |
| JP | 2004-192645 | 7/2004 |
| WO | WO 98/26370 | 6/1998 |
| WO | WO 01/35320 A1 | 5/2001 |
| WO | WO 02/089354 A1 | 11/2002 |
| WO | WO 2004/049246 A1 | 6/2004 |

* cited by examiner

CONTACTLESS PRIVACY PROTECTION DEVICE

TECHNICAL FIELD

The invention relates to a contact free device capable of filtering an exchange of communications between an RFID (radio frequency Identification) reader and the said label. The device can, depending on its embodiment, prevent the communication between the label and the reader or authorise it conditionally.

STATE OF THE PRIOR TECHNIQUE

An RFID label is a chip or a tag that is in principle passive. When the label is prompted by a reader, it responds to the said reader and sends it an identification contained in a memory of the label. The label can respond as the reader sends via an antenna of the reader, energy in electromagnetic form. It can be read at distances of between about one and several meters. It operates as follows: the label represents a load in the field of the reader, demonstrated by its circuit and a resistor in parallel to an inductance which acts as the antenna of the label. The reader emits a constant power level in time. Consequently, as in a transformer between the primary coil and the secondary coil, if the load of the secondary coil, which is to say the load shown by the label, increases, then the current or the voltage, depending on what is fixed, passing through the primary coil, which is to say the antenna of the reader, decreases. Consequently, by modulating the load of the label, we modulate the field emitted or received by the reader. The signal emitted by the label is a data signal obtained by modulating one parameter of a carrier frequency of the signal emitted, for example the amplitude, or the phase. Standards set the carrier frequencies available for the RFID labels. The frequencies currently available are for example 125 kHz, 13.56 MHz, 2.45 GHz, 5.8 GHz, and between 860 and 930 MHz.

The generalisation of the carrier objects of such RFID labels, for example via electronic product codes (EPC) poses the problem of maintaining people's privacy. For example a person equipped with a reader can identify all of the clothes or other articles worn by a person close by. It is therefore necessary to be able to protect oneself from intrusive reading of the labels without modifying the system in place and in particular the simple architecture of the labels.

DESCRIPTION OF THE INVENTION

The purpose of the invention is a contact free privacy protection device, which detects the variations of a magnetic field in one or more frequency bands allocated for the RFID labels. When an emission is detected indicating that a reader is present in a zone that is sufficiently close, called efficiency zone, to read a label protected by the device, the device modifies its own magnetic load so that makes randomly variable or constant the field that the reader or label can detect. The parameter modified by the device of the invention is the same as that modulated by the label to transmit its response. Reading an RFID label is therefore prevented for the labels in the efficiency zone of the device. If the reader is authorised, then various solutions authorising this reading can be implemented.

In summary, the invention concerns a privacy protection method designed to prevent or to authorise a communication between a reader and at least one RFID label situated in an efficiency zone of the protective device, characterised in that:

a) there is permanent detection of possible variation of an ambient magnetic field in one or more frequency bands allocated to the RFID labels, b) in the event of detection of an instantaneous variation of the local magnetic field and in the absence of inhibition, a parameter value of a magnetic circuit is modified so that the instantaneous value of the local magnetic field is modified.

This communication may be either the emission of a signal from the reader to a label or the response of a label to a reader.

In the case of an inhibition, for example in the event of recognition by the device that the reader is an authorized reader, then the parameter value is not modified so that things proceed as if the protection device was not present. We will see later that in one embodiment, the device of the invention emulates the labels that it protects.

In one embodiment for detecting a possible variation of the local magnetic field:
- a signal is produced that is representative of a mean value of the magnetic field during a detection period,
- the signal that is representative of a mean value of the magnetic field during the said detection period is compared to a representative signal of the instantaneous value of the magnetic field,
- the decision of whether there is a variation of the local magnetic field is made depending on if the result of the comparison shows a difference between the mean signal and the instantaneous signal above a predetermined level.

For the modification of the parameter of a magnetic circuit provided for in step b).

Preferably, a signal that is representative of the difference between a mean value and an instantaneous value of the magnetic field is produced and the said difference signal is used to modify the said parameter so as to bring the instantaneous value of the magnetic field to its mean value.

In this way, the intrusive reader considers that there are no labels in the efficiency zone.

In one embodiment, for the modification of the parameter of a magnetic circuit, provided for in step b) of the method, a signal is produced so that the instantaneous value of the field matches that of a value produced by any label or by any reader.

In one embodiment, when in step a) variation of the local magnetic field is detected, an interrogation is emitted to request an identification of a reader or a label.

In the event of an identification response being received, the identification is compared to each of the identifications of a list, and:
  if the identification response is identical to an identification that is on the list, then an inhibiting signal is emitted, inhibiting the modification of the parameter of the magnetic circuit. In one alternative embodiment, in the event of the identification appearing on the list, the modification of the parameter of the magnetic circuit is made so that the communication between a reader and at least one RFID label situated in the efficiency zone of the protective device is sent in encoded form,
  if there are no identification responses or if the identification received does not appear on the list, then no inhibiting signal to inhibit the modification of the parameter of the magnetic circuit is emitted.

This embodiment, where a signal that may or may not be encoded is emitted, allows communication between the readers and/or labels identified as being authorised beforehand.

In one embodiment, when in step a) a variation of the local magnetic field is detected, an electronic product code (EPC) is emitted which identifies a privacy protective device, wherein this code has in particular an object classification identification which makes it possible to determine if the object is a privacy protection device and a serial number permitting the specific device in the object classification to be identified, the EPC code emitted comprises the identification of the object classification and a fictive serial number, which varies each time that the EPC code is emitted.

In this way, the reader that may be intrusive knows that a privacy protective device is present in its efficiency zone, but it cannot identify it or recognise if it is a device that it has already detected in its efficiency zone.

The invention also concerns a privacy protective device designed to prevent or authorise a communication between a reader and at least one RFID label in an efficiency zone of the device characterized in that it comprises:

means of detecting a variation of a local magnetic field in one or more RFID frequency bands and producing a detection signal when a variation of the magnetic field is detected, means forming antenna, a magnetic load that is variable by command coupled to the said means forming antenna, control means of the variation of the said magnetic load commanding a variation of the said charge, the said control means of the variation of the said magnetic load being coupled on the one hand to the means of detecting a variation of a local magnetic field to receive from these means a signal of the detection of a variation, and being coupled to the said magnetic load that is variable by command, to modify the said load as long as the detection of the variation of a local magnetic field is received.

In this way, the field sent by the reader that may be intrusive, and modulated by the variation of load of the antenna of the label is recovered by the antenna of the privacy protective device of the invention. A detection is made of the mean amplitude of the field present in the zone where the privacy protective device is located. In the absence of a reader it is supposed that this field is constant. In the presence of a reader this field will take a value that is variable in time resulting from the field emitted by the reader, and of the modulation induced by the label. The detection of the variation of the field may be made in different ways.

For example, an envelope detector may be used to recover the amplitude variations of the field. It may be composed of a diode and a capacitor. The signal is then smoothed out by a low pass filter, comprising a resistor and a capacitor, as the time period if quite long.

This smoothing out may be carried out on several modulation periods, which is to say several bits, on an entire field or on an even bigger time period. This mean field amplitude is compared constantly to the instantaneous amplitude of the field recovered by the antenna of the privacy protective device. This comparison may be made by a differential amplifier, receiving on one input the smoothed detected signal and on the other the unprocessed signal received output from an envelope detector. If this difference is not zero, a signal output from the differential amplifier is transmitted a load modulator of the privacy protective device. The modulator then modulates the load of the privacy protective device randomly for example. In one embodiment a counter reaction of the differential amplifier allows the antenna load of the privacy protective device to be modified so as to try to cancel out this difference. This variation in load on the means forming antenna, of the privacy protective device may be obtained, for example, with a MOS transistor whose grid, and consequently its impedance, is controlled by a signal from the differential amplifier, directly if we wish to produce a constant field or via a random noise generator if the reading of the signal transmitted by the label to the reader is to be scrambled.

BRIEF DESCRIPTION OF THE DRAWINGS

Embodiments of the invention will now be described by way of non restrictive examples in reference to the appended drawings in which.

In the various figures, identical references designate elements which are identical or that have the same function.

DETAILED DESCRIPTION OF SPECIFIC EMBODIMENTS

In the following description, the protection of privacy, to inhibit or authorise label responses to the interrogation of a reader is described. However, the description makes it possible to understand how the protection can be adapted to the emission from a reader to the label.

Figure 1:
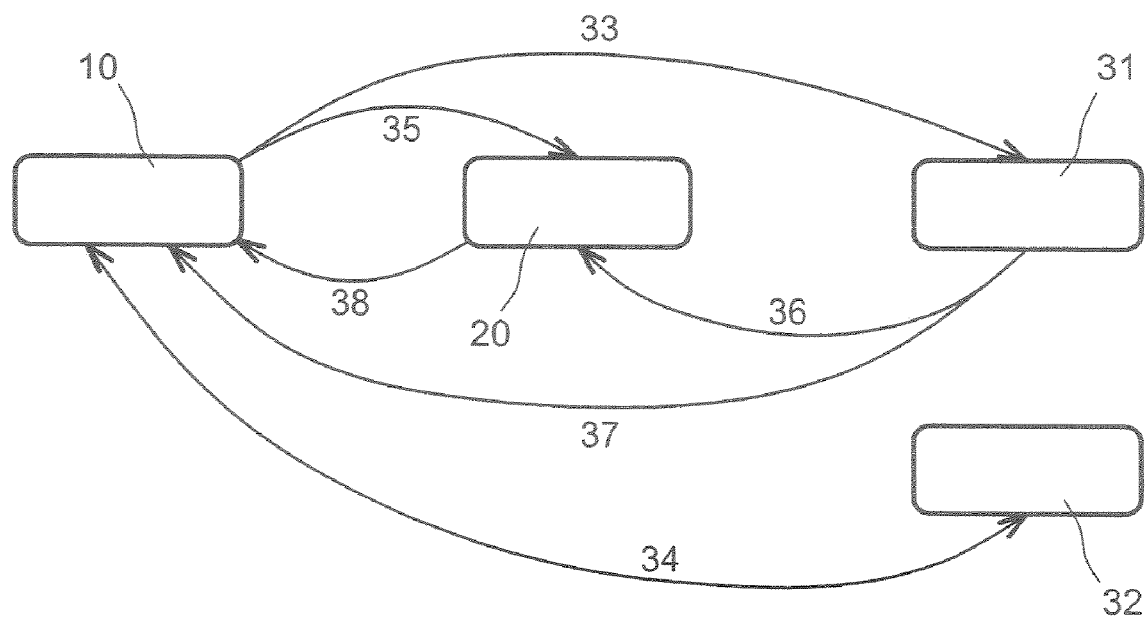
FIG. 1 shows the interposition principle of the privacy protective device of the invention between the reader and the label.

FIG. 1 shows the interposition principle of the privacy protective device of the invention between the reader and the label.

A reader 10 is shown, the privacy protective device 20 and two RFID labels 31 and 32. This is a simplified example, the number of labels is not limited.

A reader 10 emits a field in one of the frequencies in one of the frequency bands allocated to the RFID labels. This emitted field is received as shown in FIG. 1 by the arrows 33, 34 by the labels 31, 32.

In a known manner, the labels will respond in a predetermined time order, so that in a given time interval only one label responds at one time.

The response from the label for example 31 will be received, in the absence of the device 20 operating, by the reader 10, as shown by the arrow 37. In this case the response from the label 31 is also received by the privacy protective device 20 as shown by the arrow 36. If the privacy protective device 20 modifies its own load upon receipt of the emission from the label 31, the reader 10 receives a signal that is the result of the variations in load of the label 31 and the variations in load of the privacy protective device 20, as shown by the arrows 37 and 38. Consequently, the reader 10 no longer receives the response from the label 31, but another signal. Reading is prevented.

In the rest of the description, three embodiments of a privacy protective device 20 will be described, with increasing technical complexities according to whether they are remotely powered or not:

1. Passive privacy protective device 20,
2. Passive privacy protective device 20 reader emulator 10,
3. Passive privacy protective device 20 as it has an autonomous electrical power source, for example a battery.

Figure 2:
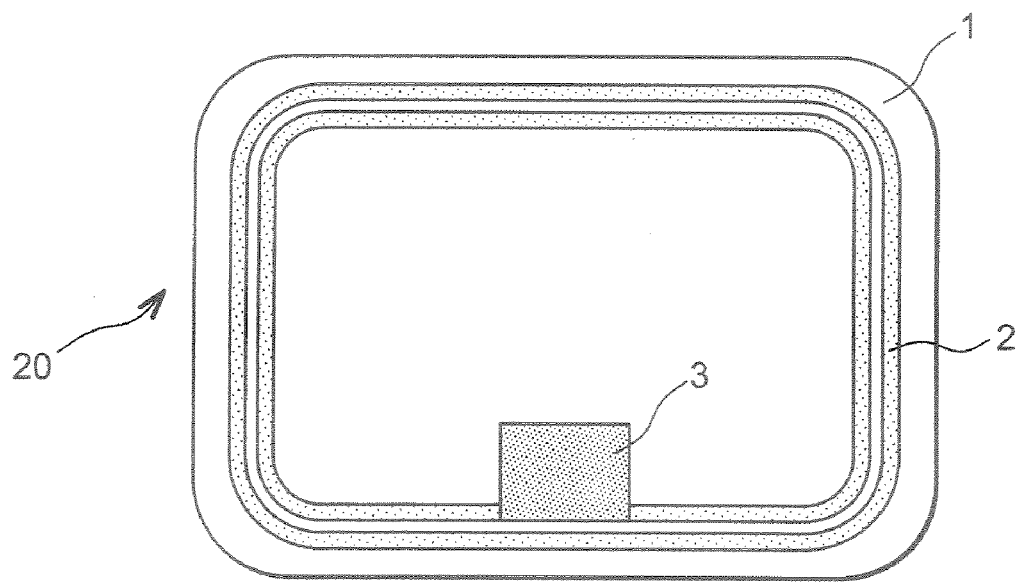
FIG. 2 shows a physical implantation of a privacy protective device of the invention.

A diagrammatical form of an embodiment of a passive privacy protection device 20 is shown in FIG. 2. The device 20 comprises, set on an insulating support 1, means forming antenna 2 connected to a chip 3 for processing signals received by the means forming antenna 2. The means forming antenna 2 are of the inductive type that can operate at low frequencies, for example in the RFID frequencies bands centered at 13.56 MHz. The antenna may also be capacitive.

Externally, the privacy protective device 20 resembles an RFID label with a chip and an antenna. The privacy protective device 20 may also be designed with discreet components. In order that the privacy protective device 20 is able to operate in all positions and intercept the field from a reader that may come from any part of the space, it may be equipped, in replacement of the inductive antenna 2 shown in FIG. 2, with a flat omni directional antenna which is itself known. The device 20 is said to be passive as it is remotely powered by the field produced by an RFID label interrogation reader, in the same way as an RFID label. The device 20 shown in FIG. 2 is mono standard. It may also be multi-standard and feature an antenna adapted to each of the several frequency bands allocated to the RFID labels. It may also be integrated into a nomad appliance, typically a mobile telephone. The advantage of such an integration will be explained below.

Figure 3:
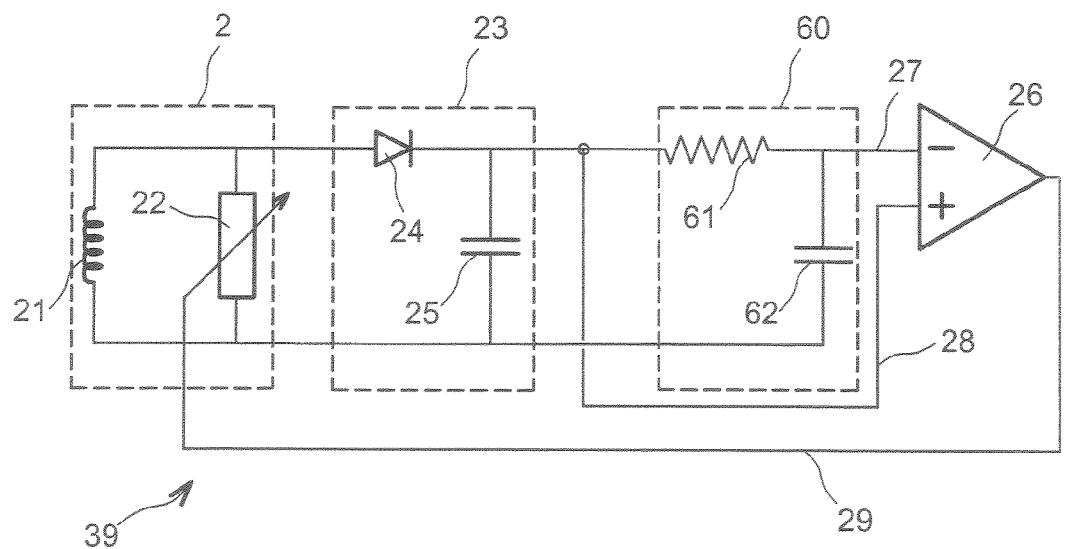
FIG. 3 shows an example of a circuit for detecting the presence of a RFID label reader in the vicinity of the privacy protective device.

One example of a circuit 39 integrated into the chip 3 which permits the device 20 to counter modulate the load is shown in FIG. 3.

The circuit 39 comprises antenna means 2. These antenna means 2 themselves comprise a means 21 of emitting and receiving a signal, for example a conductor loop as shown in FIG. 2 or a conductor coil so as to induce locally variations of the magnetic field as shown diagrammatically in 21 FIG. 3. The emission means 21 is coupled in series or as shown in FIG. 3 in parallel to a variable load 22 that is commanded. The circuit 39 also comprises an envelope detection circuit 23, a smoothing circuit in the form of a low pass filter 60 and a differential amplifier 26 of which a first input 27 is coupled to the said smoothing circuit 60. The envelope detection circuit 23, the circuit 60 and the amplifier 26 together from means of detecting a variation of the amplitude of a local magnetic field. The envelope detection circuit 23 comprises for example as shown in FIG. 3, a rectifying means 24, for example a diode, and a smoothing means 25 for the envelope detected, for example a low pass filter shown in FIG. 3 in the form of a capacitor 25, connected to the rectifying means 24. The envelope detection circuit 23 is coupled to the smoothing circuit 60 composed of a resistor 61 and a capacitor 62. The output of the circuit 60 is coupled to the input 27 of the differential amplifier 26 and carries a signal that is representative of a mean amplitude of the magnetic field received by the antenna 2. The differential amplifier 26 comprises a second input 28, couple to the envelope detection circuit 23, receiving the instantaneous signal from the antenna 2 and representing the instantaneous amplitude of the field.

It operates as follows:

The field sent by a reader that is a priori intrusive and modulated by the variation in load of the antenna of a label such as the label 31 shown in FIG. 1, is recovered by the antenna means 2 of the privacy protective device 20.

The coupled circuits 23 for detecting an envelope of the local magnetic field, and 60 for smoothing the signal received by the circuit 23, carry out the envelope detection by rectifying the signal received by the antenna means 2 by means of the envelope detector 23, and smoothing by the low pass filter shown in FIG. 3 in the form of the capacitor 62 and the resistor 61. This smoothing may be carried out on several modulation periods, which is to say several bits, on an entire field or for even longer. This mean field amplitude is constantly compared by the differential amplifier 26 to the instantaneous amplitude of the field recovered at the output of the envelope detector 23. In the example shown in FIG. 3, if this difference is not zero, a counter reaction loop 29 which receives a signal detecting a variation of the amplitude of the magnetic field received, present at the output of the differential amplifier 26 permits the a modification of the load 22 of the antenna of the privacy protective device 20 so as to try to cancel out this difference. This variation of the load 22 on the antenna 2 may be obtained, for example, by a MOS transistor whose grid and therefore impedance, is controlled by the output from the differential amplifier 26.

Figure 4:
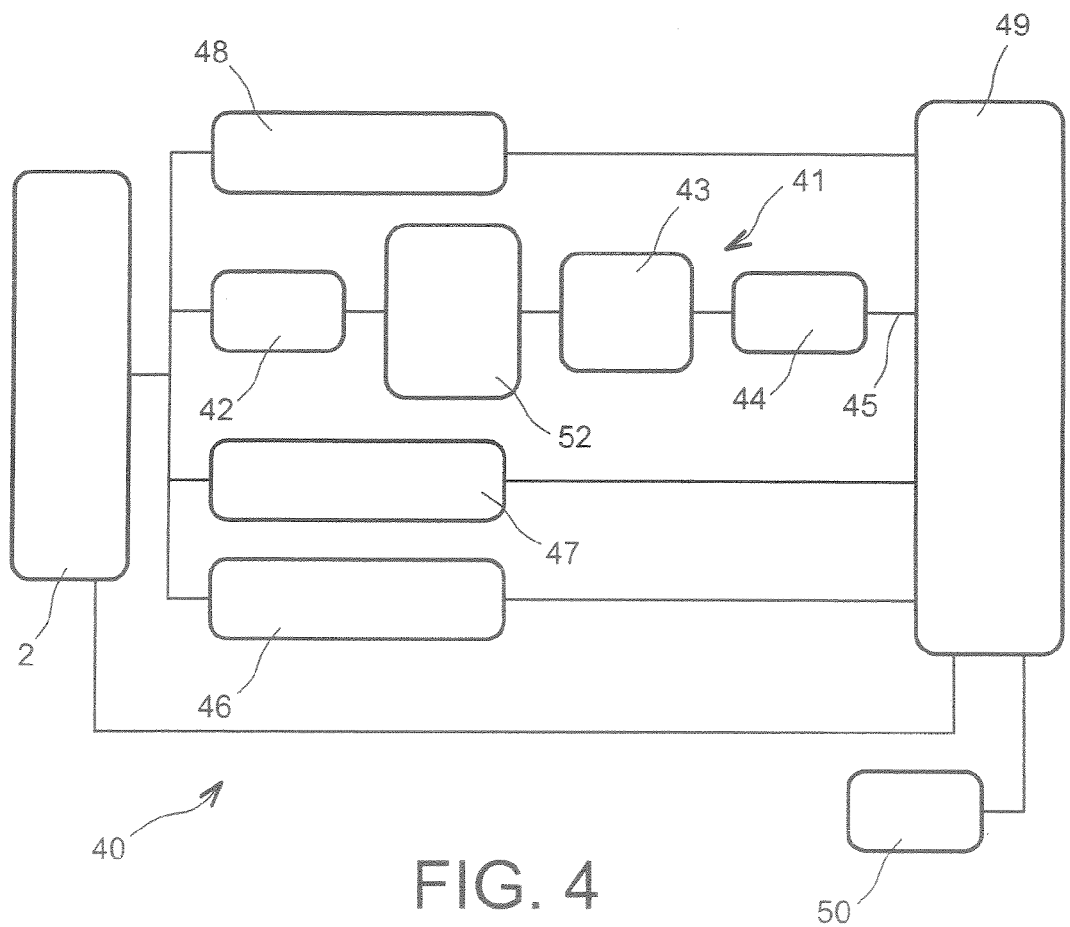
FIG. 4 shows a block diagram of another privacy protective device passive reader emulator.

FIG. 4 shows a block diagram of an example of a second embodiment of the invention, in the form of a passive circuit 40, capable in one variant of the embodiment of emulating a reader 10. This circuit comprises, connected on the one hand to antenna means 2 and to a sequencer circuit 49 which will be described later, an electrical power supply circuit 41, a circuit 46 for recovering a clock signal, a demodulator circuit 47 and a circuit 48 for counter modulating a magnetic load that is part of the antenna means 2. The electrical power supply circuit 41 recovers the energy sent by a reader 10, that is present at the antenna means 2. The electrical power supply circuit 41 comprises in series a rectifying circuit 42, rectifying the current recovered by the antenna 2, a circuit 52 for protecting against strong fields, for example in the form of a voltage or current limiting circuit, a circuit 43 for generating a reference voltage, comprising for example a Zener diode, and finally a voltage regulating circuit 44. One output 45 of the power supply circuit 41 permits a constant voltage to be supplied in good conditions to power the other circuits 46-49 forming, together with the power supply circuit 41, the scrambling circuit 40. Connections from the circuit 41 to the circuits 46-48 have not been shown. The circuit for recovering a clock signal 46 permits the clock signal to be recovered from the reader 10, from the signal received by the antenna means 2. Such clock recovery circuits are also known. The demodulator circuit 47 demodulates the signal sent by the reader 10 and received by the antenna means 2. The circuit 48 for counter modulating the load permits a shield to be made between the reader 10 and a label 31, and in certain embodiments to emulate the reader 10. The circuit 48 is used both in reception as it modulates the load opposed to the modulation produced by the response of the label 31 received by the antenna 2, and also in emission as due to the load modulation it produces at the antenna means 2, it modifies the message sent by the reader 10. Finally, the sequencer 49 permits a control of the operations being carried out by the privacy protective device 20. It can take the form of a microprocessor performing pre-programmed binary logic. It process the data flux. It is also capable of inhibiting the circuit 48 according to the sequence of events.

It operates as follows. The signal emitted by the reader is received at the antenna means 2 and used as follows. The energy contained in the signal received by the antenna 2 is recovered by the power supply circuit 41 and distributed to the other circuits as required. The clock signal of the reader 10 is recovered by the clock recovery circuit 46 from the carrier wave emitted by the reader and supplied to the sequencer 49, which is capable of understanding the message sent by the reader. The demodulator circuit 47 demodulates the signal received at the antenna 2. This signal is the result of the field produced by the reader 10 and the electromagnetic load variation produced by the response from the label 31. The signal received thus contains the data produced by the label. The demodulator 47 carries out in particular the processing of the detection in the variation of the magnetic field as described above in reference to FIG. 3. The sequencer 49 receives the information from the clock recovery 46 and demodulator 47 circuits. From this information, it detects that a reader 10 is present in an action zone of the privacy protective device 20. The sequencer 49 decides based on this information if the load needs to be counter modulated and consequently commands the load counter modulation circuit 48. The circuit 48 will see a variation of the field and will modify it by varying the load of the antenna 2. It may also smooth the amplitude of the field or add interference to the modulation. The reader is then unable to recognise the labels in the efficiency zone of the protective device.

One more advanced function may be added to the device 40. In addition to the load modulation carried out by the circuit 48 used to crop the labels in the field, the sequencer can superpose a load modulation which allows any response to be emitted to the reader 10. In this way, the device 20 is capable of making the reader 10 believe that it is a given label (any one) whilst making the reader 10 believe that all the other labels in the field of action of the device 20 are not present. In this way the device 20 plays the role of a label emulator.

A more advanced function may be added to the device 20. The circuit 48 is in fact capable not only of scrambling the label responses in the efficiency zone of the device 20 but also of scrambling the request emitted by the reader 10. Some RFID readers have quite high amplitude modulation indices, of around 90%, which are easy with a load modulation 48 to smooth or add interference.

Another improvement in the case of smoothing carried out by the circuit 48 of the request emitted by the reader 10 is to add to this smoothing the load modulation desired in order to replace the message emitted by the reader 10 by a message chosen by the protection device.

Very simple alarm functions such as a beep each time that there is an intrusion detected or a luminous signal (LED for example) may be added.

This optional function has been shown in the form of an output from the sequencer 49 coupled to an alarm 50.

More advanced functions may be added to the device.

Depending on the electrical consumption of these functions, it may be necessary to change the power supply circuit 41, by an autonomous source, such as a battery, and a suitable power supply circuit 41'. Such a modification, which makes the device of the invention active, is available to those skilled in the art and will not be described.

The device 20 may thus comprise, like an RFID label, an identifier in the form of an electronic product code (EPC code). Such an identifier contained for example in a memory of the sequencer 49 allows the reader contacting it to know that it has in its field a privacy protective device 20. An EPC code comprises in particular, a header, an object classification identification permitting, in this case, to identify whether the object is a privacy protective device and a serial number allowing a specific device to be identified within the object classification. Preferably, the code EPC emitted by the privacy protective device 20 comprises the identification of the object classification and a fictive serial number, which varies each time that the EPC code is emitted.

The identifier that is thus emitted does not allow the person carrying the privacy protective device 20 to be identified, as only the number concerning the product is fixed, which allows the reader to be informed of the presence of the privacy protective device 20 without any risk to the privacy of the owner of the device 20. Consequently, any reader is capable of communicating with a device 20 as if it were an RFID label. In return, in one embodiment of the privacy protective device 20, the programme of the sequencer is provided so as to request the reader for an identifier if such a reader is detected, and thus possibly any information concerning it. The sequencer 49 comprises in this embodiment memory means stocking a list of RFID label authorised reader identifications. The sequencer 49 commands the command means 48 for the variation of the magnetic load of the antenna means 2, to vary the said load so that it produces an interrogation.

The sequencer does not activate the command means 48 for the variation of the magnetic load, if a favourable response is received which identifies a reader on its list. In one variant of the embodiment, when a favourable response is received, the device 20 emulates the labels that it is protecting. In another variant of the embodiment, in the case of a favourable response, the sequencer is programmed so that it creates a secure communication with a cryptographical protocol with a public key between the device 20 and the reader.

Some functions of the device 20 which have been described in reference to FIG. 4, require a sequencer that has a memory, a programme that consumes energy such that the energy sent by the reader may be insufficient to power it. In such a situation, the power supply 41 is adapted for powering from an autonomous source such as a battery, as explained previously.

In this case it is particularly advantageous to integrate the device 20 onto another nomad object comprising an autonomous electrical power supply, in particular a mobile telephone.

The antenna 2 may be, in this case for example, pressed onto the back of the telephone and advantageously its electrical circuit may be integrated into that of the same telephone.

The invention claimed is:

1. A privacy protection method to prevent or authorize a communication between a reader and at least one RFID label situated in an efficiency zone, implemented by a privacy protection device separate from the reader and the RFID label, comprising:
   a) detecting a possible variation of a local magnetic field in one or more frequency bands allocated to the RFID label, corresponding to a request emitted by the reader to the RFID label or to a response from the RFID label to the reader; and
   b) in an event of detection of the possible variation, scrambling the request emitted by the reader or the response from the RFID label by modifying a parameter value of a magnetic circuit of the privacy protection device so as to counter modulate a load to modify the request emitted by the reader,
   wherein the modifying the parameter of a magnetic circuit provided in b) includes producing a signal that is representative of a difference between a signal representative of a mean value and a signal representative of an instantaneous value of the local magnetic field and using the difference to modify the parameter so as to bring the instantaneous value of the local magnetic field to its mean value.

2. A privacy protection method of claim 1, in which:
   when in a) the variation of the local magnetic field is detected, emitting an interrogation requesting the identification of the reader or or the RFID label,
   in an event of an identification response being received, comparing the identification to each of identifications on a list,
   if the identification response is identical to an identification appearing on the list, emitting an inhibiting signal, which inhibits the modifying of the parameter of the magnetic circuit provided in b), and
   if there is no identification response or if the identification received does not appear on the list, then no inhibiting signal inhibiting the modifying of the parameter of the magnetic circuit is emitted.

3. A privacy protection method of claim 1, in which:
when in a) the variation of the local magnetic field is detected, emitting an interrogation requesting identification of the reader or the RFID label,
in the event of an identification response being received, comparing the received identification to identifications on a list,
if the identification response is identical to an identification appearing on the list, modifying the parameter of the magnetic circuit so that communication between the reader and at least one RFID label situated in an efficiency zone is transmitted in encoded form, and
if there is no identification response or if the identification received does not appear on the list, then no inhibiting signal inhibiting the modification of the parameter of the magnetic circuit is emitted.

4. A privacy protection method of claim 1, in which:
when in a) a variation of the local magnetic field is detected, emitting an electronic product code (EPC), which identifies a privacy protective device, wherein the EPC includes an object classification identification that can determine that an object is a privacy protective device and a serial number permitting identification of a specific device within the object classification, wherein the EPC emitted includes the object classification identification and the serial number, which varies each time that the EPC is emitted.

5. A privacy protection device to prevent or authorize a communication between a reader and at least one RFID label in an efficiency zone of the device, comprising:
means for detecting a variation of a local magnetic field in one or more RFID frequency bands, corresponding to a request emitted from the reader to the RFID label or a response from the RFID label to the reader, and producing a detection signal when a variation of the magnetic field is detected;
means for forming an antenna;
a load variable by a command coupled to the means for forming the antenna; and
command means for commanding a variation of the load after reception of the detection signal to scramble the request emitted by the reader or the response from the RFID label respectively by modifying the request emitted by the reader,
wherein the command means modifies the request by producing a signal that is representative of a difference between a signal representative of a mean value and a signal representative of an instantaneous value of the local magnetic field and using the difference to modify the request so as to bring the instantaneous value of the local magnetic field to its mean value.

6. A privacy protection device of claim 5, in which the means of detecting the variation of the local magnetic field in one or more RFID frequency bands and producing the detection signal when the variation of the magnetic field is detected comprises:
demodulator means, coupled to the means for forming the antenna, for demodulating a signal captured by the means for forming the antenna; and
a sequencer, coupled to the demodulator means, for receiving the detection signal, wherein the sequencer is coupled to the means for commanding the variation of the load to command an activation of the command means.

7. A privacy protection device of claim 6, wherein the sequencer comprises memory means storing a list of identifications of authorized RFID label readers, or a list of label identifications, wherein the sequencer commands the means for commanding the variation of the load to vary the load so that the load produces an interrogation, wherein the sequencer does not activate the means for commanding the variation of the load, if a response is received identifying a reader or a label appearing on the list.

8. A privacy protection device of claim 7, further comprising means permitting emission, when the variation of the local magnetic field is detected, of an electronic product code (EPC) identifying the privacy protection device, wherein the EPC includes an identification of an object class that can determine that an object is a privacy protection device and a serial number permitting a specific device within the object classification to be identified, wherein the EPC emitted comprises identification of the object classification and a serial number, which varies each time that the EPC is emitted.

9. A nomad device or a mobile telephone comprising a battery, and the device of claim 5.

10. A privacy protection method of claim 1, wherein the detecting of the possible variation of the local magnetic field includes,
producing a signal that is representative of the mean value of the local magnetic field during a detection period,
comparing the signal that is representative of the mean value of the local magnetic field during the detection period to a signal that is representative of the instantaneous value of the local magnetic field, and
deciding that there is a variation of the local magnetic field if a result of the comparing shows a difference between the signal representative of the mean value and the signal representative of the instantaneous value that is higher than a predetermined level.

11. A privacy protection device of claim 5, wherein the means for detecting includes,
means for detecting a magnetic field envelope coupled to the means for forming the antenna and providing instantaneous amplitude of a signal captured by the means for forming the antenna,
a low pass filter coupled to the means for detecting the magnetic field envelope, and
a differential amplifier with a first input coupled to the low pass filter and a second input coupled to the means for detecting the magnetic field envelope, and an output carrying the detection signal.

* * * * *